United States Patent Office 3,264,203
Patented August 2, 1966

3,264,203
METHOD OF POLYMERIZING VINYL ETHERS
George J. Atchison, Midland, and Raymond M. Narlock, Bay City, Mich., assignors to The Dow Chemical Company, Midland, Mich., a corporation of Delaware
No Drawing. Filed Apr. 10, 1963, Ser. No. 271,885
4 Claims. (Cl. 204—159.24)

This invention relates to the polymerization of vinyl ethers. It pertains especially to an improved process for polymerizing aliphatic vinyl ethers.

Polymers of aliphatic vinyl ethers and methods of making the same are known. For example, U.S. Patent No. 2,098,108 polymerizes vinyl butyl ether in admixture with sulfur dioxide to obtain a colorless viscous, sticky product. British Patent No. 832,483 discloses a method wherein vinyl isobutyl ether is polymerized in contact with catalysts consisting of metals of the third group of the Periodic System which have been irradiated with high energy ionizing radiation.

It has now been discovered that vinyl ethers can readily by polymerized by subjecting the ether to the action of high energy ionizing radiation while in contact or in admixture with sulfur dioxide.

It has further been found that the use of both sulfur dioxide and high energy ionizing radiation has an added or synergist action for promoting the polymerization of the vinyl ether that is greater than obtained with either sulfur dioxide or high energy ionizing radiation alone under otherwise similar reaction conditions.

The vinyl ether starting materials can be any vinyl ether, but is preferably an aliphatic vinyl ether such as methyl vinyl ether, ethyl vinyl ether, propyl vinyl ether, isopropyl vinyl ether, butyl vinyl ether, isobutyl vinyl ether, or a mixture of any two or more of such vinyl alkyl ethers.

The high energy ionizing radiation as is well known in the art can be gamma rays, beta rays, X-rays or high speed electrons. Convenient sources of such high energy ionizing radiations are cobalt 60, X-ray machines, linear accelerators, and Van de Graaff accelerators. The high energy ionizing radiation is suitably of an intensity corresponding to a field of at least 10,000 rads per hours. The rad is a unit of absorbed dose corresponding to 100 ergs per gram as adopted by the Seventh Congress of Radiology, Copenhagen, 1953.

In general, a total dose of from about 0.5 to 10 megarads is sufficient radiation to initiate and complete or substantially complete the polymerization of the monomeric vinyl ether, when used in combination with the monomer in contact or in admixture with a small amount of sulfur dioxide.

The sulfur dioxide is used in amounts that may vary from a mere trace of the sulfur dioxide to five percent by weight or more of the monomers, but is preferably used in an amount corresponding to that which is dissolved in the liquid monomer at room temperature and atmospheric pressure.

In practice, the monomeric vinyl ether is placed in a suitable reaction vessel and sulfur dioxide gas is bubbled through the liquid monomer until the liquid is saturated or substantially saturated with the $SO_2$. Thereafter, the mixture is subjected to the action of high energy ionizing radiations, e.g. X-rays, beta-rays, gamma rays, or high speed electrons, for a total dose of from 0.5 to 10 megarads, after which the volatile ingredients including unreacted monomer is separated from the polymeric product in usual ways, such as by vaporization and withdrawal from the polymer under subatmospheric pressure.

The polymer is usually obtained as a colorless material which may vary from a mobile fluid to a viscous liquid or semi-solid and is useful for a variety of purposes in the home and industry such as the preparation of adhesives, calking compositions and as additives for oils or lubricants.

The following examples illustrate ways in which the principle of the invention has been applied, but are not to be construed as limiting its scope.

*Example 1*

A charge of 38 grams (50 ml.) of vinyl isobutyl ether containing 0.01 percent hydroquinone and 0.05 percent triethanolamine as polymerization inhibitors, was placed in a glass reaction vessel having the form of a jacketed beaker, and equipped with a magnetic stirrer. The open end of the vessel was covered with a film of polyethylene one mil thick and was held in place by a rubber band around an upper portion of the vessel. The vessel was positioned under the exit window of a vertical Van de Graaff electron accelerator. The magnetic stirrer was rotated to agitate the vinyl isobutyl ether in the vessel, and water was passed through the jacket of the vessel to control the temperature of the vinyl isobutyl ether therein. The vinyl isobutyl ether was maintained at temperatures between 5° and 15° C. Sulfur dioxide, ($SO_2$), gas was bubbled through the agitated vinyl isobutyl ether for a period of about 15 minutes to saturate the liquid with the $SO_2$ gas. Thereafter, the Van de Graaff accelerator was started. The vinyl isobutyl ether saturated with $SO_2$, was subjected to high speed electrons from the Van de Graaff accelerator operating at 1 microampere beam current and 2 mev. potential for a period of one hour for a total dose of 6 megarads with the electrons passing downward through the one mil thick polyethylene film and into the liquid vinyl isobutyl ether maintained at temperatures between 5° and 15° C. After completing the irradiation, the material was transferred to a vacuum chamber and was maintained at room temperature under an absolute pressure of 10 mm. of Hg for a period of 24 hours. The residue was weighed and analyzed. There was obtained 32 grams of poly(vinyl isobutyl ether) as a colorless liquid having an average molecular weight of about 700.

In contrast, when 38 grams of vinyl isobutyl ether are treated in similar manner but without subjecting it to irradiation with high speed electrons there is obtained only 20.6 grams of liquid polymer.

*Example 2*

In each of a series of four experiments, a charge of 38 grams (50 ml.) of vinyl isobutyl ether was saturated with sulfur dioxide gas and was subjected to the action of high speed electrons, and the polymer recovered employing procedure similar to that employed in Example 1. There was obtained a total of 130 grams of poly(vinyl isobutyl ether) as a colorless liquid having the properties:

| | |
|---|---|
| Specific gravity, at 210° F./4° F. | 0.8571 |
| Viscosity, centipoises at 210° F. | 231.6 |
| Fire point, ° F. | 220 |
| Flash point, ° F. | 195 |
| Mol. wt. | 797 |
| Sulfur, percent | 0.35 |

Similar yields of polymeric vinyl ethers are obtained when vinyl methyl ether, vinyl butyl ether, vinyl ethyl ether, vinyl propyl ether or mixtures of any two or more such vinyl ethers are polymerized by the action of high energy ionizing radiations while in contact with sulfur dioxide.

We claim:
1. In a process for polymerizing a vinyl ether the improvement which consists in subjecting the ether in contact with sulfur dioxide to the action of high energy ionizing radiation in a field having an intensity of at least 10,000 rads per hour.

2. A process for polymerizing a vinyl alkyl ether which comprises subjecting said ether in contact with sulfur dioxide to the action of high energy ionizing radiation in a field having an intensity of at least 10,000 rads per hour.

3. A process for polymerizing vinyl isobutyl ether which comprises subjecting the ether in contact with sulfur dioxide to the action of high energy ionizing radiation in a field having an intensity of at least 10,000 rads per hour.

4. A process as claimed in claim 3 wherein the high energy ionizing radiation is high speed electrons.

References Cited by the Examiner

UNITED STATES PATENTS 2,098,108  11/1937  Reppe et al. _____ 260—675 X
3,081,244  3/1963  Campanile.

OTHER REFERENCES

Bolt and Carrol: Radiation Effects on Materials, Academic Press, 1963, New York, pp. 97–99.

MURRAY TILLMAN, *Primary Examiner.*

N. F. OBLON, *Assistant Examiner.*